United States Patent [19]

Spengler

[11] Patent Number: 4,748,417
[45] Date of Patent: May 31, 1988

[54] METHOD AND CIRCUIT ARRANGEMENT FOR SWITCHING A CLOCK-CONTROLLED DEVICE HAVING A PLURALITY OF OPERATING STATUSES

[75] Inventor: Werner Spengler, Munich, Fed. Rep. of Germany

[73] Assignee: Siemens Aktiengesellschaft, Berlin and Munich, Fed. Rep. of Germany

[21] Appl. No.: 809,035

[22] Filed: Dec. 16, 1985

[30] Foreign Application Priority Data

Feb. 5, 1985 [DE] Fed. Rep. of Germany ....... 3503832

[51] Int. Cl.$^4$ .......................... H03K 5/26; H03L 7/00
[52] U.S. Cl. ......................................... 328/72; 328/55; 328/154; 307/480
[58] Field of Search ............... 307/441, 463, 219, 241, 307/243, 269, 480; 328/63, 55, 72, 104, 154, 73

[56] References Cited

U.S. PATENT DOCUMENTS

| | | | |
|---|---|---|---|
| 3,539,933 | 11/1970 | White | 307/269 |
| 3,932,816 | 1/1976 | MacGregor | 328/61 |
| 4,156,200 | 5/1979 | Gomez | 328/104 |
| 4,229,699 | 10/1980 | Frissell | 328/63 |
| 4,398,155 | 8/1983 | Howell, Jr. et al. | 307/480 |
| 4,919,629 | 12/1983 | O'Brien | 307/269 |

*Primary Examiner*—Stanley D. Miller
*Assistant Examiner*—Timothy P. Callahan
*Attorney, Agent, or Firm*—Hill, Van Santen, Steadman & Simpson

[57] ABSTRACT

At least two operating statuses selected by a selection signal are respectively controlled by connecting an individual clock signal sequence. A change of the selection signal initially remains ineffective until the next clock edge of a defined direction has appeared in the previously selected clock signal sequence. The clock signal status which has thus appeared is maintained until the next clock edge of the same direction has appeared in the clock signal sequence allocated to the operating status to be activated. This clock signal sequence is now connected through to the clock-controlled device. This type of delayed switching results in complete clock periods in the connected through clock signal, even given changes in the selection signal which occur asynchronously thereto.

9 Claims, 3 Drawing Sheets

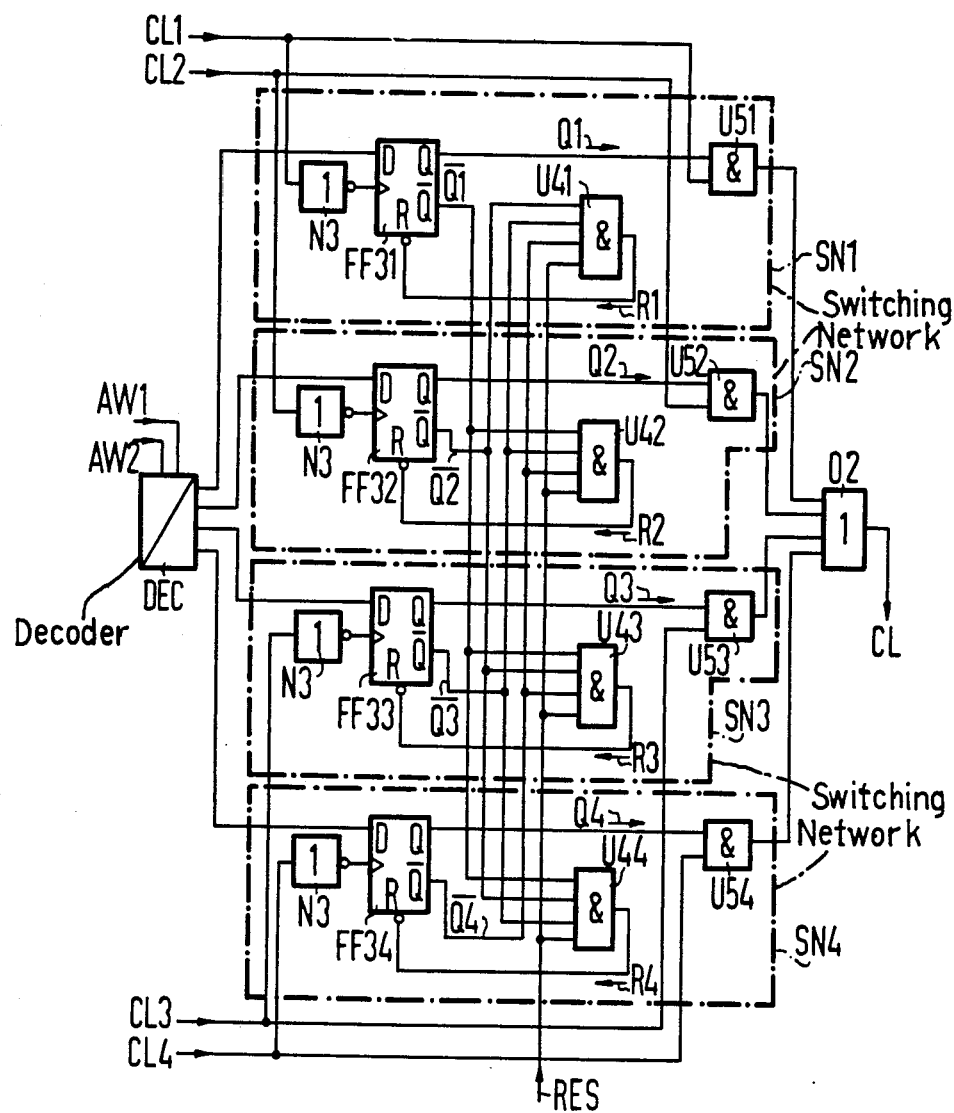

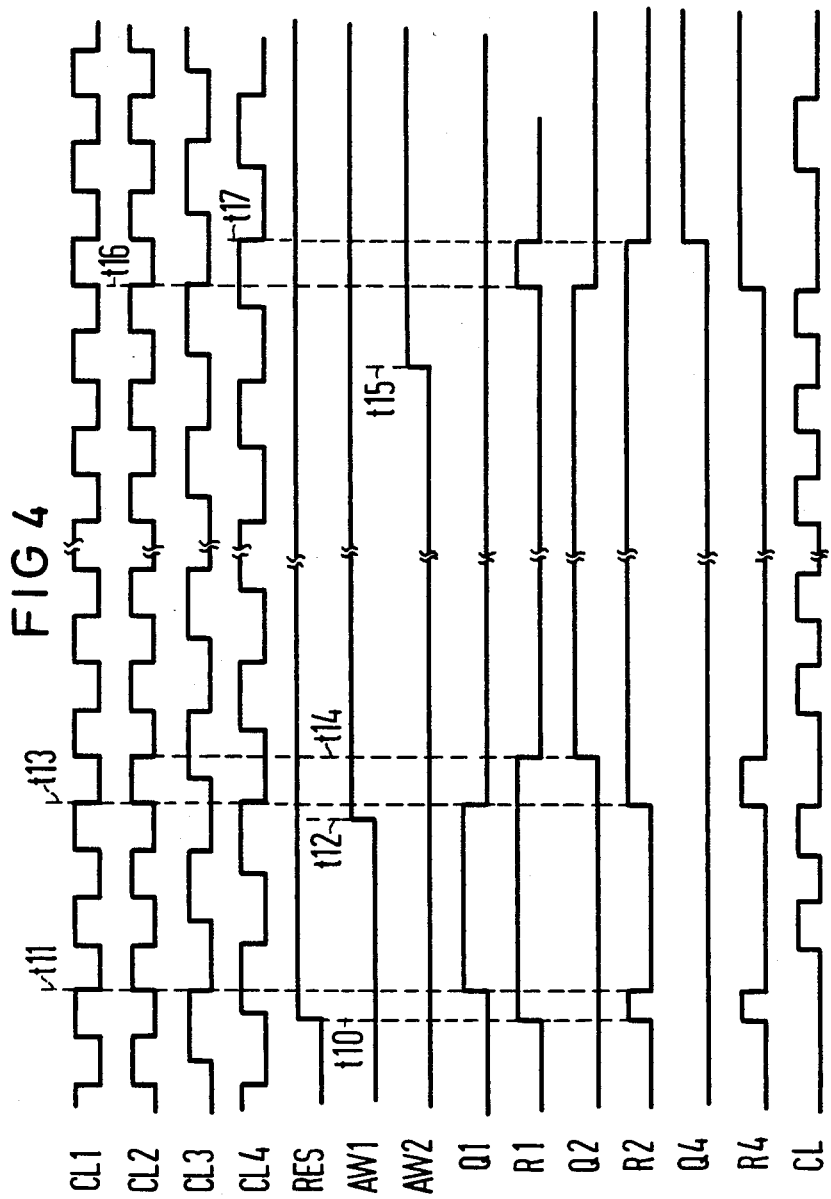

METHOD AND CIRCUIT ARRANGEMENT FOR SWITCHING A CLOCK-CONTROLLED DEVICE HAVING A PLURALITY OF OPERATING STATUSES

BACKGROUND OF THE INVENTION

The invention relates to a method for switching a clock-controlled device having at least two operating statuses respectively controlled by an individual clock signal sequence. The operating statuses are selected by a static selection signal.

Electronic controls are successfully employed in a number of areas wherein a clock supplied from the outside in the form of a pulse sequence defines the chronological execution of the control function. Different operating statuses are frequently defined in such clock-controlled devices. These statuses can then also be respectively based on different clock signal sequences. It is conceivable that the clock signal sequences individually allocated to the operating statuses only differ from one another in terms of their phase relation, but have the same pulse repetition frequency. However, it can also occur that the events in the various operating statuses—prescribed by external boundary conditions—must sequence with differing speed, and that the individual clock signal sequences then even differ in terms of their pulse repetition frequency.

Without limitation thereto, let a practical application of such a clock-controlled unit be pointed out here by way of example. Peripheral devices of electronic data processing, particularly peripheral storage devices, are often connected to a data-processing system in groups, and are connected thereto via an allocated control unit. This unit assumes the job of monitoring the function of the peripheral storage devices that are connected, thereby initiating write/read events and transmitting the corresponding data from or to the data-processing system in a system-suited form. In accordance with known industrial standards for disk storage interfaces, for example, the data traffic between the control unit and an allocated disk storage device is synchronized in that various clock signal sequences are transmitted from the disk storage device to the control unit. When reading out stored data, for example, this can be a read clock signal, whereas a reference clock signal is employed for all other events, this reference clock signal being derived from read information which is stored on what is referred to as the servo surface of the disk storage device.

These clocks control a sequential controller in the control unit, whereby the problem results that a certain slip dependent on the respective phase relation of the participating clock signal sequences occurs in the transition from one operating status to another, i.e. when switching from one clock signal sequence to another. This fact is not yet critical per se. However, incomplete clock periods must be avoided, especially when the switchover—as frequently occurs—is initiated asynchronously relative to the clock signal sequence just selected. Otherwise, a faulty working of the sequential switching network in the control unit in which data loss or miscontrols can occur would result.

In such clock-controlled devices having a plurality of operating statuses respectively controlled by an individual clock signal sequence and which are in turn set by an externally supplied selection signal, it is therefore necessary to execute the clock switchover while taking chronological boundary conditions into consideration in order to assure an error-free transition from one operating status into another.

SUMMARY OF THE INVENTION

It is therefore an object of the invention to create a method of the type initially cited which also enables an error-free transition from one operating status into another when the individual operating statuses have individual clock signal sequences having different phase relation and/or pulse repetition frequency allocated to them. The switchover is initiated asynchronously relative to these clock signal sequences.

Given a method of the type initially cited, this object is achieved in accordance with the invention such that when a status change is indicated by the selection signal, the clock signal sequence being connected through continues until the next pulse edge change in a predetermined direction occurs. Thereafter, the system checks when a new desired clock signal sequence experiences a pulse edge change in the same predetermined direction. When this occurs, then the new clock signal sequence is fed to the output. It is first assured with this method that the actual switchover event from a clock signal sequence hitherto selected to a different clock signal sequence respectively occurs only when both clock signals assume a predetermined signal status, i.e. low or high, depending upon the application. Due to the different phase relations of the clock signal sequences which are thereby possible relative to one another, such a chronological coincidence of the signal statuses cannot be presumed without further work in the general case. For this reason, a waiting time has been created with the method of the invention. This waiting time extends from the end of a clock period of the clock signal sequence hitherto selected up to the beginning of a clock period of the clock signal sequence to be selected, and the signal status of the clock signal sequence connected through to the controlled device does not change during this waiting time.

The fact that such a method can be realized in a very simple way with a low expenditure for switch means results from the system constructed according to the invention. A switchover device is provided whose core contains a series of storage elements independent of one another in terms of their switch statuses in combination with a logical switching network. These storage elements control themselves and the switching network such that, proceeding from the individual operating instance, the switchover is not unnecessarily delayed, i.e. the superimposed waiting time is minimized in accordance with the differing phase relation of the corresponding clock signal sequences which is established at the moment.

In a clock-controlled device, it is thus possible with low circuit expenditure to undertake the transition from one operating status into another without loss of a clock signal change significant for the controller of the clock-controlled device and without involved re-phasing of the controlled device to a clock having a modified phase relation and/or frequency. The switchover event can thus be initiated in an entirely asynchronous fashion, and there are no limiting boundary conditions for the clock signal sequences respectively allocated to the various operating statuses, namely boundary conditions with respect to phase relation and/or frequency. The method of the invention and the corresponding switchover device destined for the implementation of the method are therefore extremely flexible in terms of use and can be employed in combination with a great variety of different clock-controlled devices.

BRIEF DESCRIPTION OF THE DRAWINGS

FIG. 3 is a block circuit diagram of a further embodiment; and

FIG. 4 illustrates pulse diagrams for explaining the function of the circuit arrangement shown in FIG. 3.

DESCRIPTION OF THE PREFERRED EMBODIMENTS

Figure 1:
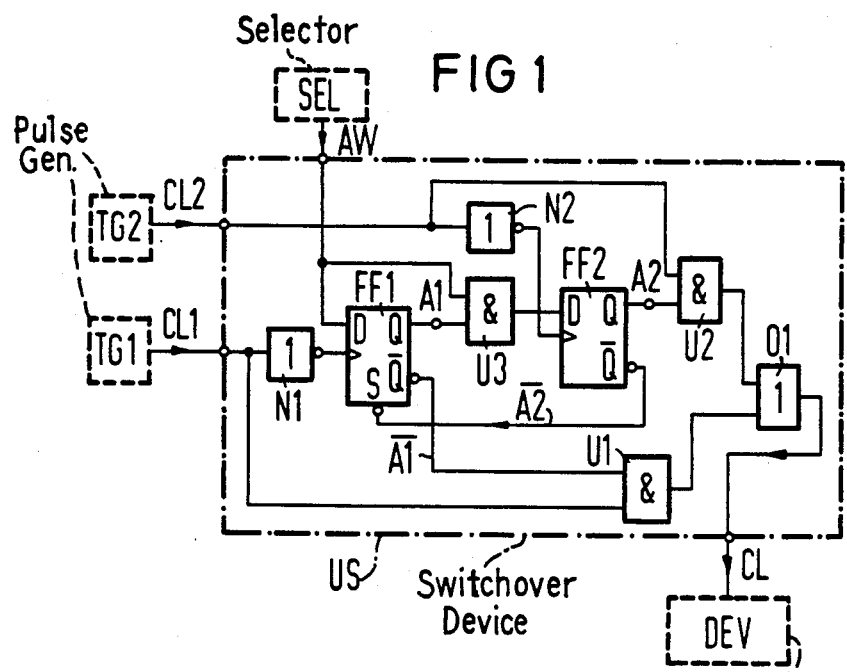
FIG. 1 is a block circuit diagram of a circuit arrangement for the implementation of the method of the invention.

The block circuit diagram of FIG. 1 essentially shows a switchover device US which receives two clock signal sequences CL1 and CL2 at its input side, and to which a static selection signal AW is also supplied. One of the clock signal sequences CL1 or CL2 is alternatively selected with this selection signal AW and is connected through to the output of the switchover device US. The corresponding output clock signal is referenced CL. For the sake of completeness, the block circuit diagram of FIG. 1 schematically indicates that the two clock signal sequences CL1 and CL2 are generated by a respective clock pulse generator TG1 or TG2, and that the selection signal AW is emitted by a selector SEL. The output clock signal CL, finally, is supplied to a controlled device referenced DEV. The corresponding blocks for the two clock pulse generators TG1, TG2, the selector SEL, and the controlled device DEV are shown with broken lines in order to indicate that these units do not form part of the invention being presented here. They may be constructed in traditional circuit technology in accordance with the respective application and, in this regard, are subject only to the restriction that the corresponding transmit or receive signals are compatible in terms of signal level.

In the switchover device US, each of the two clock signal sequences CL1 or CL2 is respectively supplied to a first input of a corresponding AND element U1 or U2 and, parallel thereto, is respectively supplied to a corresponding inverter N1 or N2. The first inverter emits the first clock signal sequence CL1 in inverted form to the clock input of a first D-flip-flop FF1 which receives the selection signal AW at its D-input. This flip-flop emits an output signal referenced A1 at its normal output, this output signal A1 being supplied to an input of a third AND element U3. This AND element U3 directly receives the selection signal AW at its second input and emits an output signal to a second D-flip-flop FF2 whose clock input is connected to the output of the second inverter N2. The normal output of this second flip-flop FF2 carries an output signal referenced A2 which is supplied to the second input of the second AND element U2. The inverted output of the second D-flip-flop FF2 is fed back to a setting input S of the first D-flip-flop FF1 in inverted fashion. The output stage of the switchover device US, finally, is formed by an OR element 01 whose input side is connected to the outputs of the two AND elements U1 and U2 and whose output carries the output clock signal CL. The described circuit arrangement is constructed of commercially available elements and its details are then likewise directed to their properties. Thus, for example, the D-flip-flops FF1 and FF2 which are employed are triggered by the positive signal edge of a clock, and the inverters N1 and N2 are therefore employed here. Similar considerations apply to the design and thus the wiring of setting or reset inputs, as shall be shown later.

The function of this switchover device US shall be set forth in detail below with reference to the pulse diagrams shown in FIG. 2. It is defined in this exemplary embodiment that a low level of the selection signal AW which is shown in the third line of FIG. 2 selects the first clock signal sequence CL1, and its high level selects the second clock signal sequence CL2. It is thus assumed in accordance with the illustration of FIG. 2 that the first clock signal sequence CL1 is initially selected and connected through to the output of the switchover device US. The first D-flip-flop is thereby held in its reset condition via the static selection signal AW, and the first AND element U1 is thus enabled to connect the first clock signal sequence CL1 through to the OR element 01.

At a point in time t1, the status of the selection signal AW changes and thus initiates the selection of the second clock signal sequence CL2. The position of the point in time t1 is completely arbitrary with respect to the phase relation of the two clock signal sequences CL1 and CL2. The first D-flip-flop and the third AND element U3 are thus initialized, but the flip-flop is not switched until the next negative clock edge of the first clock signal sequence CL1. At this point in time t2, the output signal A1 of the first D-flip-flop FF1 shown in the fourth line of FIG. 2 assumes a high signal level. The first AND element U1 is inhibited at the same time, and thus the output clock signal CL is held at a low level.

In this condition, the third AND element US is connected through and thus initializes the second D-flip-flop FF2. When the next negative clock edge of the second clock signal sequence CL2 then appears at point in time t3, the second D-flip-flop FF2 is also set. As shown in line 5 of FIG. 2, this means, first, a status change of its output signal A2 which activates the second AND element U2, so that the second clock signal sequence CL2 is now connected through to the output of the switchover device US. Second, the first D-flip-flop FF1 is now held via the setting input S connected to the second D-flip-flop.

This switch status of the switchover device US now remains unmodified as long as the selection signal AW does not change its signal status. It may be derived from the illustration of the output clock signal CL shown in line 6 of FIG. 2 that a switchover from the first clock signal sequence CL1 to the second clock signal sequence CL2 can occur only given a low level of both clock signal sequences. Regardless of the mutual phase relation of the two clock signal sequences and the status change of the selection signal AW which is asynchronous thereto, it is thus assured that the switchover operation can never lead to an incomplete clock period which could elicit undefined statuses in the clock-controlled device DEV and thus possibly produce a faulty function.

Figure 2:
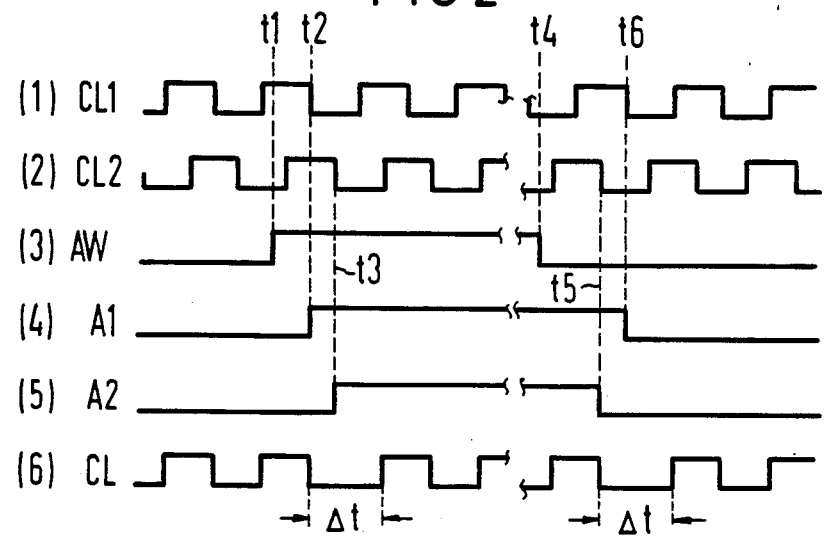
FIG. 2 illustrates a number of pulse diagrams for explaining the function of the circuit arrangement shown in FIG. 1.

FIG. 2 also illustrates the execution when switching over in the opposite direction which is initiated at a point in time t4 with a resetting of the static selection signal AW. The third AND element U3 is inhibited at this point in time. When the following, negative clock edge then appears in the second, hitherto selected clock signal sequence CL2 at point in time t5, the second D-flip-flop is reset and the second AND element U2 is inhibited with the low level of the corresponding output signal A2. Only at this point in time is the first D-flip-flop FF1 enabled, so that it is switched over at point in time t6 when the next, negative clock edge of the first clock signal sequence CL1 which has now been selected again appears. The output signal A1 of this flip-flop is thus reset and the first AND element U1 is again enabled at the same time, so that the first clock signal sequence CL1—again beginning with a low level—is connected through to the output of the switchover device US.

It has been assumed in the exemplary embodiment set forth that the two clock signal sequences CL1 and CL2 have the same pulse repetition frequency, but different phase relations relative to one another. With reference to the pulse diagrams of FIG. 2, it can be traced that the respective phase relation of the two clock signal sequences relative to one another causes different delays in the switchover. On the basis of the design of the circuit arrangement, two limit values derive for the length for the low level of the output clock signal CL, this length being referenced Δt in FIG. 2. It can be easily seen that the chronological spacing (t3-t2) increasingly shrinks with less and less of an advance of the first clock signal sequence CL1 relative to the second clock signal sequence CL2, but cannot reach the value 0 because of the transit time in the circuits. The lower limit value for Δt thus amounts to at least half a clock period given a 50% pulse duty factor. Based on such a slight advance of the first clock signal sequence, it follows by analogy that, in this case, the time spacing (t6-t5) must amount to nearly a full clock period, and that the upper limit value for Δt lies at 1.5 clock periods.

The described circuit arrangement, of course, could also process clock signal sequences having different repetition frequencies. When the clock period of the higher-frequency clock signal sequence is referenced, for example, T1, and the clock period of the lower-frequency clock signal sequence is referenced T2, then the lower limit value for Δt amounts to at least ½T1 and the corresponding upper limit values amounts to at most (½T1+T2). These observations can also be expanded by analogy to clock pulse sequences having a different pulse duty factor.

As shown in the block circuit diagram of FIG. 3, the above-described method and circuit concept can also be expanded to a plurality of mutually independent clock pulse sequences and their selective selection. The switchover device of FIG. 3 is based, for example for n clock signal sequences CLn, on four clock signal sequences CL1 through CL4. Thus, n different work statuses in general, and four different work statuses of the switchover device in this exemplary embodiment are prescribed. These are respectively defined by one of n or one of four possible signal combinations of selection bits AW1, AW2. These selection bits are offered to a decoder DEC which is designed here for a 4-of-2 selection.

The decoder outputs are individually connected to a respective one of a plurality of identically constructed switching networks SN1 through SN4 (in general, SNn). Each of these networks has a D-flip-flop FF3n to whose data input D the allocated output of the decoder DEC is connected. The clock input of the D-flip-flop FF3n is connected via an inverter N3 to a signal line which carries the allocated input clock signal sequence CLn—CL1, CL2, CL3 or CL4 in this instance. Each of the D-flip-flops FF3n possesses a reset input R which is connected to the output of an AND element U4n. Every AND element U4n has four inputs. One of these inputs is connected to a common control line which carries a reset signal RES. The three remaining inputs of each of the AND elements U4n are wired such that the corresponding AND element U41 through U44 in each of these switching networks SN1 through SN4 is connected to all inverse outputs $\bar{Q}$ of the D-flip-flops FF3n of the remaining switching networks. Over and above this, each switching network also contains a further AND element U5n whose input side is connected both to the normal output Q of the D-flip-flop FF3n of this switching network SNn as well as to the corresponding signal line which carries the allocated input clock signal sequence CLn. The outputs of all AND elements U5n are connected in common via an OR element 02 to the output of the switchover device which emits the output clock signal sequence CL.

The function of this second embodiment shown in FIG. 3 is essentially analogous to the first embodiment already set forth in detail with reference to FIGS. 1 and 2, and can therefore be summarized with reference to the pulse diagrams shown in FIG. 4. The first four lines of FIG. 4 illustrate four mutually independent input clock signal sequences CL1, CL2, CL3, and CL4. The fifth line shows the reset signal RES which should first exhibit a low level. As a consequence, all AND elements U4n of the switching networks are initially inhibited, and thus the D-flip-flops FF3n are reset. The output signals of the AND elements U4n are referenced R1, R2, R3, and R4, and—insofar as needed for an understanding—are shown in the pulse diagrams of FIG. 4. In this condition, thus all D-flip-flops FF3n emit output signals Q1, Q2, Q3, or Q4 with low level at their normal outputs Q. The further AND elements U5n are thus inhibited, so that the output clock signal CL also lies at a low level.

Let the reset signal RES change its signal status at point in time t10. Both of the selection bits AW1 and AW2 should thereby not be set. Let this signal combination select the first input clock signal sequence CL1, this meaning that a high signal level is adjacent to the data input D of the D-flip-flop FF31 of the first switching network SN1. The D-flip-flop FF31 of this switching network is set with the trailing edge of the first clock signal sequence CL1 appearing at point in time t11, and the output signal Q1 thereof connects the input clock signal sequence CL1 at the allocated AND element U51 through to the output. This functional sequence corresponds to the function of the embodiment set forth with reference to FIGS. 1 and 2, with the one difference that the additionally employed reset signal RES herein allows the switchover device to initialize in defined fashion, for example after the operating voltage has been turned on.

Let the signal combination of the two selection bits AW1 and AW2 change at point in time t12 such that the second input clock signal sequence CL2, for example, is now selected. With the next-following, trailing edge of the input clock signal sequence CL1 hitherto selected, i.e. at point in time t13, the D- flip-flop FF31 which was hitherto set is reset and the allocated AND element U51 is inhibited. With the resetting of the hitherto selected D-flip-flop FF31, the reset inputs R of all remaining flip-flops are released. The D-flip-flop FF32 in the second switching network SN2 is allocated t the input clock signal sequence CL2 now selected. It is initialized via its data input D and is set at point in time t14 with the next-following, trailing edge of the input clock signal sequence CL2 which is now selected. The AND elements U4n of all remaining switching networks are thus inhibited and the allocated D-flip-flops FF3n are reset, whereas the second input clock signal sequence CL2 is connected through to the output at the same time via the further AND element U52 situated in the selected switching network SN2.

This condition is maintained until a change of the signal combination in the selection bits AW1 and AW2 appears again. Let both selection bits AW1, AW2 be set at a point in time t15. In response thereto, the allocated D-flip-flop FF32 is reset at point in time t16, i.e. with the appearance of the next trailing edge of the hitherto selected input clock signal sequence Cl2, as may be seen with reference to the status change of the output signal Q2. Let the fourth clock signal sequence CL4 now be selected with the assumed selection signal combination, the next trailing edge of this sequence CL4 setting the initialized D- flip-flop FF34 in the switching network SN4 at point in time t17. The fourth input clock signal sequence CL4 is thus selected and appears at the output of the switchover device as output clock CL. With the setting of the D-flip-flop FF34 in the fourth switching network SN4, a reset pulse RES is again output to all other D-flip-flops FF3n at the same time, as may be seen in the illustration of FIG. 4 with reference to the signals R1 or R2. This switching continues in arbitrary form, dependent on status changes of the selection bits AW1 and AW2.

It is thus also guaranteed in the second embodiment that, given a change of selection, it is always only the set flip-flop FF3n which changes in status and thus cancels the previously selected input clock signal sequence CLn. Only then can one of the other D-flip-flops assume a new status. Also assured here by the selection of the trailing edge of the various input clock signal sequence as a triggering value is that switchovers with reference to the output clock signal sequence CL can always only occur with the commencement of the low level of the selected input clock signal sequence. The relationships for the delay in the switching phase set forth for the first embodiment therefore also result in this second embodiment.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for switching a clock-controlled device having at least first and second operating statuses during which the clock-controlled device is controlled by respective first or second individual clock signal sequences which may differ in phase and frequency, comprising the steps of:
   providing a status change selection signal for indicating a change from the first clock signal sequence to the second clock signal sequence at any time point of the first clock signal sequence;
   feeding the first clock signal sequence to the clock control device;
   on receiving the status change selection signal indicating a change from the first to the second clock signal sequence, sensing for the next occurring pulse edge of the first clock signal sequence in a predetermined direction, and after occurrence of said pulse edge in the predetermined direction checking for a next pulse edge in said predetermined direction of the second clock signal sequence; and
   upon occurrence of said next pulse edge in said predetermined direction in said second clock signal sequence, always switching the feed to the clock-controlled device from the first clock signal sequence to the second clock signal sequence regardless of the first and second clock pulse sequence phase or frequency.

2. A method for switching from a first individual clock signal sequence to a second individual clock signal sequence which may differ in phase and frequency, comprising the steps of:
   feeding the first individual clock signal sequence to a clock controlled device without phase change;
   providing a selection signal for indicating a desired status change from the first individual clock signal sequence to the second individual clock signal sequence at any time point of the first clock signal sequence;
   upon occurrence of the selection signal indicating a change in status, sensing for a falling edge in the first clock signal sequence which is feeding the clock-controlled device and thereafter sensing for the next falling pulse edge of the second clock signal sequence; and
   after occurrence of the falling pulse edge in the second clock signal sequence, always switching the feeding to the clock-controlled device from the first clock signal sequence to the second clock signal sequence regardless of the first and second clock pulse sequence phase or frequency such that the second clock signal sequence now feeds the clock-controlled device without phase change.

3. A device for switching a clock-controlled device having at least first and second operating statuses during which the clock-controlled device is controlled by respective first or second individual clock signal sequence which may differ in phase and frequency, comprising:
   first means for providing a status change selection signal for indicating a change from the first clock signal sequence to the second clock signal sequence at any time point of the first clock signal sequence;
   second means connected to receive the first and second clock signal sequences, and also being connected to the first means to receive the status change selection signal and which, upon receiving the status change selection signal indicating a change from the first to the second clock signal sequence, senses for a next occurring pulse edge of the first clock signal sequence in a predetermined direction, and after occurrence of said pulse edge in the predetermined direction, checks for a next pulse edge in said predetermined direction of the second clock signal sequence, and for always switching a feed to the clock-controlled device of the first clock signal sequence to the second clock sequence upon occurrence of said next pulse edge in said predetermined direction in said second clock signal sequence regardless of first and second clock signal sequence phase or frequency; and a third means connected to said second means for feeding either the first clock signal sequence of the second clock signal sequence to the clock-controlled device.

4. A system for switching a clock-controlled device having at least first and second operating statuses during which the clock-controlled device is controlled by respective first or second individual clock signal sequences which may differ in phase and frequency, comprising:
- a selection signal input at which a selection signal is present indicative of either the first or second operating status desired;
- a first flip-flop having a first input connected to receive the first clock signal sequence and a second input connected to the selection signal input, and having a first output connecting to a first input of a logic circuit, and a second input of said logic circuit connecting to said selection signal input;
- a second flip-flop having a first input connected to receive the second clock signal sequence and a second input connected to an output of said logic circuit, and having the second flip-flop first output connected to a first input of a first AND gate whose second input connects to the second clock signal sequence;
- a second AND gate having its first input connected to a second output of the first flip-flop and a second input connected to the first clock signal sequence; and
- an OR element having its first input connected to an output of the first AND gate and a second input connected to an output of the second AND gate, and wherein an output of the OR element is connected for controlling the clock-controlled device.

5. A system according to claim 4 wherein a second output of the second flip-flop connects to a third input of the first flip-flop.

6. A system according to claim 4 wherein said logic element comprises an AND gate.

7. A system according to claim 4 wherein a first NOR element connects the first clock signal sequence to the first input of the first flip-flop, and a second NOR element connects the second clock signal sequence to the first input of the second flip-flop.

8. A system according to claim 4 wherein the first and second flip-flops are D-flip-flops.

9. A system for switching through to a clock-controlled device any one of first, second, third, or fourth clock signal sequence which may differ in phase and frequency, comprising:
- decoder means for selecting one of the first, second third, and fourth clock signal sequences;
- first, second, third, and fourth switching network means each having an input for receiving a respective one of the first, second, third, or fourth clock signal sequence;
- each of the first, second, third, and fourth switching network means having an ouput connecting to a logic circuit whose output connects to the clock-controlled device to be controlled;
- each of the switching network means comprising a flip-flop having a first input connecting to the respective clock signal sequence, a second input connecting to a respective output of the decoder means, a first output connecting to a first input of a first AND gate, a second AND gate having first, second, third, and fourth inputs, and an output connecting to a reset input of the flip-flop, and a second output of the flip-flop connecting to all of the second AND gates of the other switching network means; and
- said second AND gate having its first, second, and third inputs connecting to the other switching network means and its fourth input connecting to a reset signal input.

* * * * *